Oct. 25, 1966  K. BEYERLE ETAL  3,281,067
GAS CENTRIFUGE WITH    TING DRUM
Filed Aug. 29, 1960  4 Sheets-Sheet 2

Inventors:
KONRAD BEYERLE
KARL HEINZ WELGE

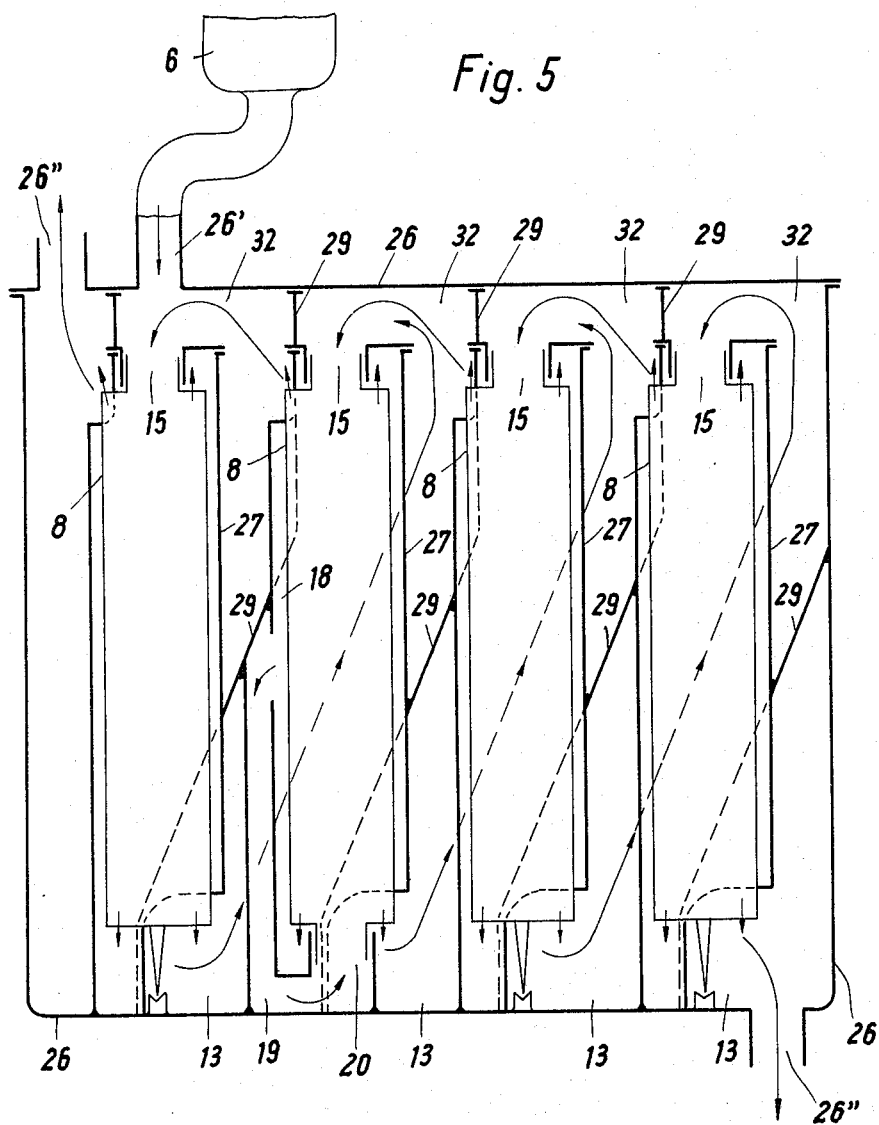

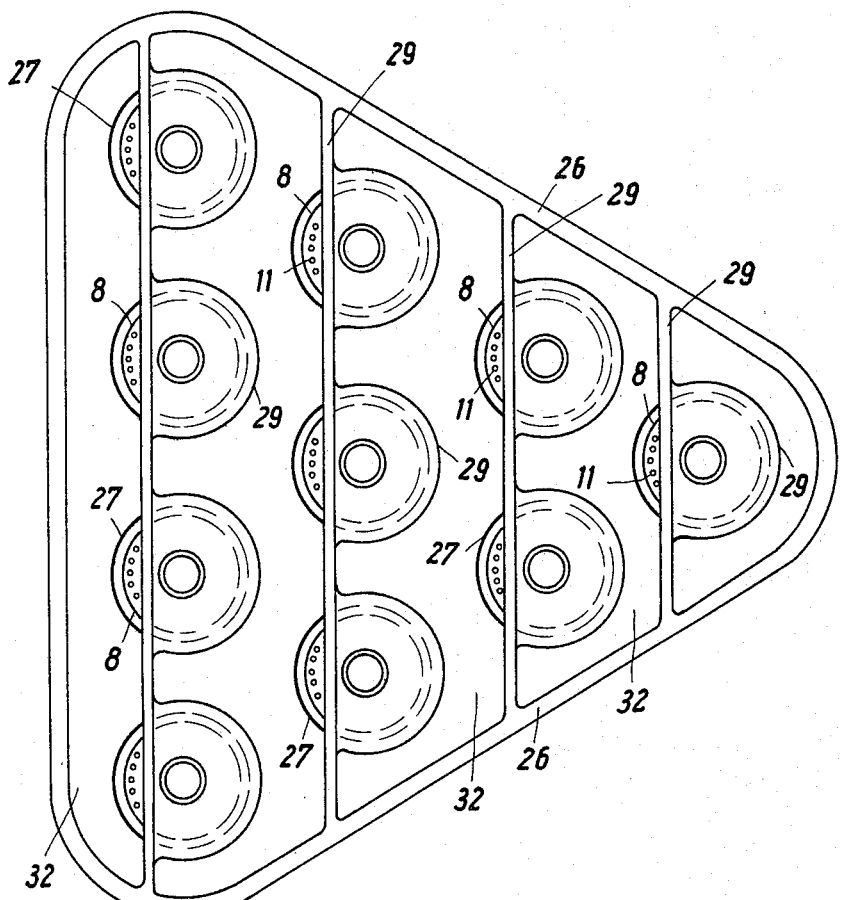
Fig. 6
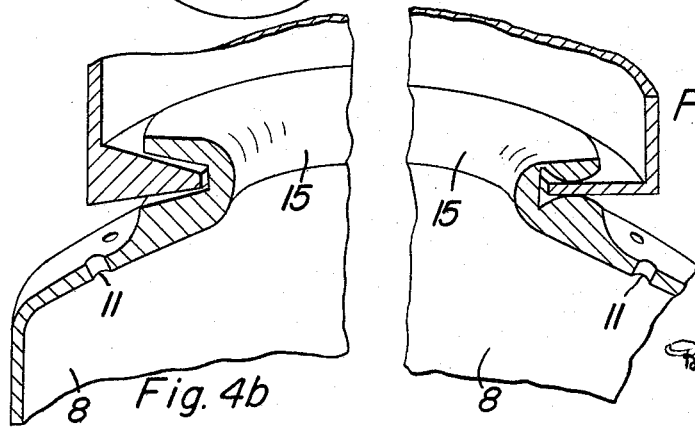
Fig. 4c
Fig. 4b
Inventors:
KONRAD BEYERLE
KARL HEINZ WELGE

United States Patent Office 3,281,067
Patented Oct. 25, 1966

3,281,067
GAS CENTRIFUGE WITH ROTATING DRUM
Konrad Beyerle, Charlottenstrasse 14, Aachen, Germany, and Karl Heinz Welge, Endenicherstrasse 273, Bonn, Germany
Filed Aug. 29, 1960, Ser. No. 52,430
Claims priority, application Germany, Aug. 28, 1959, B 54,605
7 Claims. (Cl. 233—18)

The present invention relates to a gas centrifuge with rotating drum. The gas centrifuges have the task to separate a gas mixture into fractions of different masses.

The gas centrifuges are distinguished clearly from the liquid fluid centrifuges, since a liquid is always present as a medium in the liquid fluid centrifuges. The difference of the aggregate states of the medium to be treated in gas centrifuges, on the one hand, and in liquid fluid centrifuges, on the other hand, requires a basically different mode of operation.

Gas centrifuges with rotating drums for the separation of isotopes are known. In order to bring about appreciably large separating effects in such gas centrifuges, the drum must receive a possibly highest rotary speed. This requires in case of condensable gases a low gas pressure on the inner wall of the drum, in view of their vapor pressure, and a correspondingly still lower gas pressure on the drum axle. By this arrangement it becomes impossible to suck off the optimum gas stream through the conduits. In order to overcome these difficulties it has been proposed to provide feeding devices in the rotating drum. These feeding devices operate under the principle of the banking pipe by exploitation of the static and dynamic pressure of the rotating gas.

These auxiliary means, used in the previous attempts of solving the feeding problem, reduce, to an appreciable extent, the separation effect. They cause undesirable whirl formations and thus disturb the pressure distribution and axial gas circulation. The previously known counter measures require more or less complicated structures, particularly separation wall in the rotating drum or chambers on the drum covers. If the total length of the drum is given, in order to remain below a predetermined critical number of revolutions, the mentioned means amount to a visible loss of the effective length, and, thereby, also of the final results. Furthermore, stationary banking pipe feeders create heat by gas friction, whereby the temperature of the rotor, which is surrounded by vacuum, is less easily controllable. Additional problems of the gas feeding occur also in case of arrangement of a plurality of centrifuges in series or parallel arrangement in the form of columns.

It is, therefore, one object of the present invention to provide a gas centrifuge with a rotating drum wherein the mentioned drawbacks of the known constructions are avoided and which particularly solves advantageously the problems connected with the gas feeding by novel means.

It is another object of the present invention to provide a gas centrifuge with a rotating drum, wherein the gas emerges directly into the space surrounding the drum due to the adjustable over-pressure by the centrifugal force through properly calibrated discharge openings on the drum covers or on the wall of the drum. A group of each of said discharge openings is provided in the vicinity of each end of the drum for counter current centrifuges. Furthermore, means are also provided to prevent a mixing together of the fractions emerging from these discharge openings or of mixing with the mixture fed to the centrifuge. For this purpose, the spaces, namely the discharge chambers, which surround the discharge openings, are separated from each other and, furthermore, also from the entrance chamber, which feeds the mixture to the drum, by narrow slots, which constitute high flow resistances in comparison with the gas conduits connected with the discharge chambers.

It is yet another object of the present invention to provide a gas centrifuge with a rotating drum wherein for the separation of the discharge chambers from each other and from the entrance chamber separation means as for instance known molecular pumps are provided, the rotating parts of which are formed by the outer faces of the drum itself or by particular construction elements rigidly connected with the drum.

It is furthermore another object of the present invention to provide a gas centrifuge with a rotating drum wherein the space disposed between the discharge chambers of the separated gas fractions has a predetermined, selected volume and is evacuated in order to reduce the pressure.

It is also still another object of the present invention to provide a gas centrifuge with a rotating drum wherein the space disposed between the discharge chambers is additionally connected with the space disposed within the axial range of the lower pressure of the drum by means of a special channel.

It is yet a further object of the present invention to provide a gas centrifuge with a rotating drum, wherein, in order to bring about a good separation and sealing, respectively, between the standing and rotating parts of the centrifuge, an annular slot is provided at the entrance opening for the mixture fed thereto which slot surrounds the gas stream. The faces of this slot may be plane faces and/or ball faces and/or conical faces, depending upon the desired moving possibilities between the standing and the rotating parts of the centrifuge.

It is also still another object of the present invention to provide a gas centrifuge with a rotating drum wherein a combination of a plurality of centrifuges is combined to a column of centrifuges. As stated above, the entrance and discharge chambers of adjacent centrifuges must be connected together by conduits in case of column arrangements, the flow resistance of such conduits being small compared with the flow resistances of the slots separating the said chambers. This requirement leads to cross-sections for the conduits which may be applied, only with difficulties, to the housings of the centrifuges. In case of an arrangement of columns, an extremely great number of such column connections are involved which must form vacuum-tight connections. In order to render, on the one hand, still smaller the flow resistances, as it would be possible with the largest, suitable diameter of the conduit suitable for the connection to the housing of the gas centrifuge, and in order to reduce, on the other hand, the number of the vacuum-tight flange connections to practically a single connection, all centrifuges of one column are built into a common housing, which is closed up by a common cover in a vacuum-tight manner. Instead of connecting conduits, it is possible to use connection channels, which consist of suitably formed walls or guide faces, either set into the common housing or formed as parts of the common housing. By this arrangement, much smaller flow resistances are encountered, than by an arrangement of particular conduits. In addition, the mentioned channels correspond, within the common housing, with the desired column arrangement.

With these and other objects in view which will become apparent in the following detailed description, the present invention will be clearly understood in connection with the accompanying drawings, in which:

FIGS. 4b and 4c are fragmentary sections of two additional embodiments of the sealing means of an entrance opening for the centrifuge;

FIG. 5 is a schematic section of a centrifuge column disposed in a sealed housing; and FIG. 6 is a top plan view of the centrifuge column shown in FIG. 5.

Figures 1, 2:
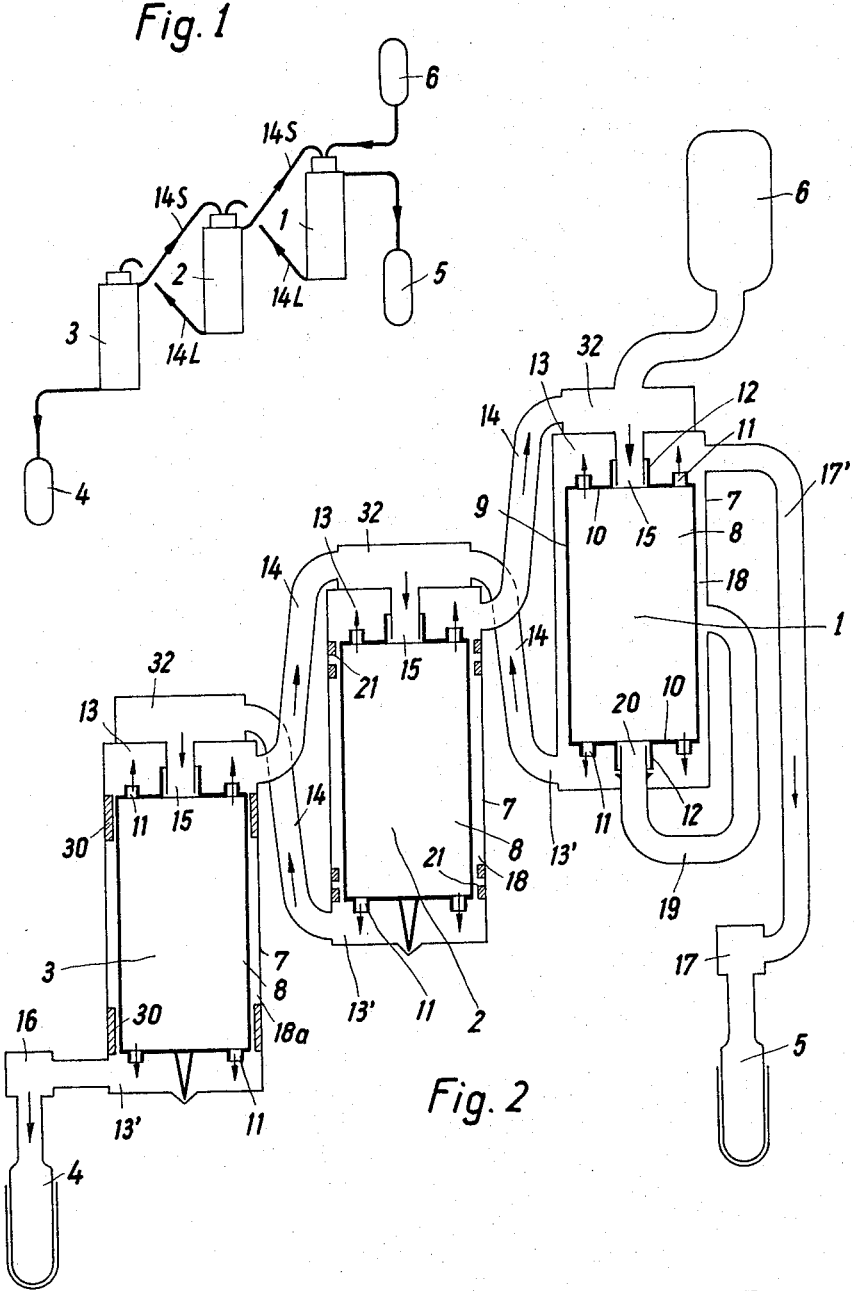
FIGURE 1 is a schematic elevation of a centrifuge column.
FIG. 2 is a schematic elevation, partly in section, of a centrifuge column, showing details of the gas centrifuge, designed in accordance with the present invention.

Referring now to the drawings, and in particular to FIG. 1, a column arrangement of the gas centrifuges is shown, wherein the gas mixture to be separated is fed from a storage container 6 to the first centrifuge 1. It is well understood that instead of a single centrifuge 1, it is also possible to provide a plurality of parallel-connected centrifuges. The light fraction of the centrifuge 1 is fed by means of the lower conduit 14L into the centrifuge 2.

The heavy fraction of the centrifuge 2 is again fed to the centrifuge 1 by means of the upper conduit 14S and the heavy fraction emerging at the top of the centrifuge 1 is fed to a receiving container for the heavy fraction 5. The centrifuge 2 is connected with the centrifuge 3 in such manner that the light fraction of the centrifuge 2 is fed into the centrifuge 3 by means of the lower conduit 14L and the heavy fraction is fed from the centrifuge 3 by means of the upper conduit 14S to the centrifuge 2. The centrifuge 3 is connected with a receiving container 4 for the light fraction.

The column arrangement, disclosed in FIG. 1, is based on the arrangement shown in greater detail in FIG. 2. Each of the centrifuges 1, 2 and 3 comprises a housing 7 and a drum 8. A drum slot 18 is defined between the housing 7 and the drum 8. The drum 8 is equipped with a cover 10 which is equipped with gas discharge openings 11. In the centrifuges, shown in the drawings, the gas discharge openings 11 lead into chambers 13 and 13′, respectively. The chambers 13′ are connected with the entrance openings 15 of another drum and with the entrance openings 16 of the receiving container 4 by means of the conduits 14′, which offer little flow resistance. The chambers 13 are connected by conduits 14 with the previous centrifuges and by conduit 17′ with the entrance opening 17 of the receiving container 5. The feeding of the original gas mixture into the entrance openings 15 takes place through a drum neck 12. The gas flows under the effect of the centrifugal force directly from the drum 8 through the openings 11 into the chamber 13′ and through the conduit 14′ into the next drum and also through the upper openings 11 into the chamber 13 and by means of the conduit 17′ to the receiving container 5. Particular pump devices or feeding arrangements for the gas stream are superfluous in the shown centrifuges. Additional centrifuges (not shown), which operate in parallel at the same level, are connected together by means of connecting chambers 32.

The radial pressure distribution experienced in the drum 8 is directly exploited for the gas feeding in the centrifuge, without requiring the provision of particular removing devices and feeding devices, respectively.

The drive for the drums 8 takes place in very well known manner and such drive means are, therefore, not a part of the present invention and do not require a detailed disclosure.

In order to keep the gas exchange through the gas slot 18 between the chambers 13 and 13′ surrounding the ends of the drums 8 as small as possible, the gas pressure in the chambers 13 is held, on the one hand, as low as possible. On the other hand, care must be taken that the gas pressure in the chambers 13 is at such a level, that optimum gas streams can be fed to the entrance openings 15 of the drums 8. In order to make possible such compromise, while maintaining sufficient pressure in the chambers 13 and 13′, without accepting excessive gas friction losses in the drum slot 18, the latter may be connected to a known pumping device or vacuum producer (not shown). In the centrifuge 1, the slot 18 is connected by means of a conduit 19 and a special drum opening 20 with the axial inner space of the drum 8. By this arrangement, the pressure in the slot 18 is adjusted to low pressure prevailing within the axial range of the drum 8.

Molecular pumps 21, cooperating with the drum 8, are provided for the evacuation of the drum slot 18 in the centrifuge 2. The molecular pumps 21 may be disposed on the wall of the housing 7 as well as on the wall of the drum 8.

The molecular pumps 21 may be arranged, however, also in such manner, that they are disposed between the covers 10 and a corresponding projection arranged on the wall of the housing 7. The means taken for adjustment of the pressure in the slot 18 can also be combined. Two narrower drum slots 30, operating as sealing means, and a median further drum slot 18a are provided in the centrifuge 3.

It is of advantage to reduce the flow resistances at the entrance openings 15 to a minimum.

Figure 3:
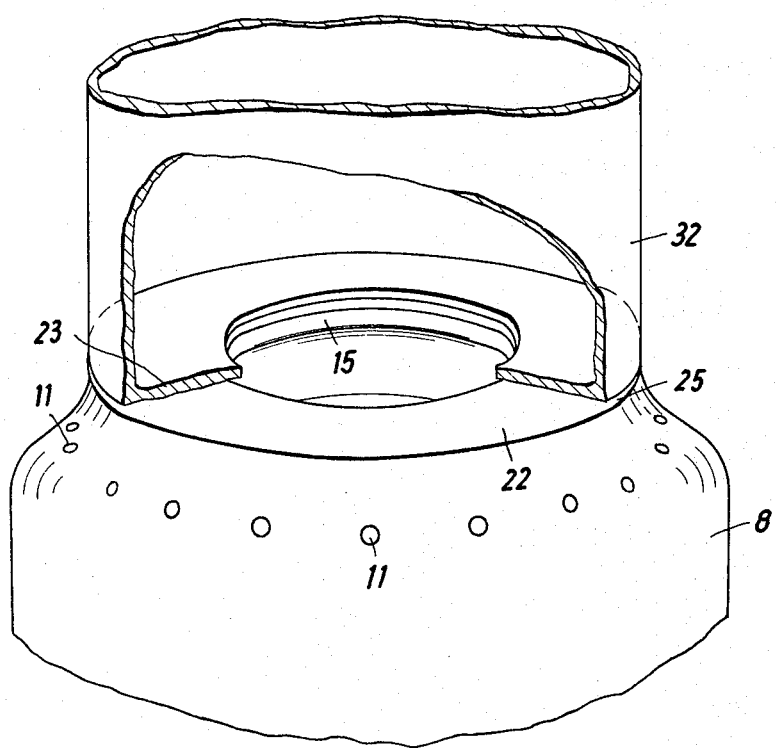
FIGS. 3, 4 and 4a are perspective front views, partly in section, of different embodiments of the sealing means of an entrance opening for the centrifuge.

Referring now to FIG. 3, the sealing of the inlet openings 15 is brought about by means of the annular disk faces 22 and 23. The entrance opening 15 may be maintained, thereby, at large dimensions.

Figure 4:
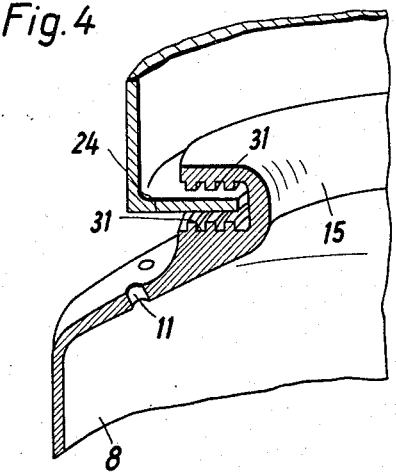
Figure 4A:
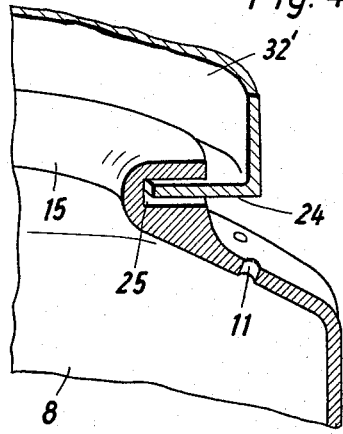

In the embodiment shown in FIG. 4a, an annular groove 25 is provided in the outer neck of the opening 15, which groove 25 receives an annular disk 24. This disk is formed by the end portion of the feeding conduit 32′. The groove 25 may be arranged, however, also on the inside of the opening 15 (not shown), in which case the disk 24 engages the groove 25 in the form of a collar from the inside. If necessary, several disks and grooves may be provided in a series arrangement.

A molecular-screw pump 31 may be provided between the disk 24 and the groove 25, as shown in FIG. 4. This molecular screw pump 31 is adjusted in such manner, that the gas is fed radially outwardly and radially inwardly, respectively, depending upon arrangement of the groove on the inside or the outside of the neck of the opening 15.

It is to be understood that instead of the shown flat faces, it is also possible to provide ball faces or conical faces or in a similar manner, curved faces, and it is also possible to provide a combination of these additional faces with the plane faces.

The described sealings, shown in FIGS. 3, 4 and 4a, can be used in the gas centrifuges 1, 2 and 3 of FIG. 2, and in particular in the entrance openings 15, as well as in the opening 20.

In order to adjust the pressures desirable for the performance of the process in the simplest manner, a column may be arranged in a manner disclosed in FIGS. 5 and 6. A plurality of drums 8 is disposed in a single, sealed housing 26 which encloses the entire arrangement. The housing 26 has a feeding conduit 26′ for the gas to be treated and discharge conduits 26″ for the separated fractions. The drums 8 are surrounded by envelopes 27, which are secured in the housing 26. Separating walls 29 are disposed between the individual centrifuges and between the latter and the housing 26, in such manner, that common collecting chambers 32 and 13 result at the entrance and discharge openings of the centrifuges, each of which operates in parallel with the other centrifuges at the same level. All arrangements for realization of the gas channels necessary for the reduction of the gas pressure in the drum slot 18 are likewise obtained by forming suitable separating walls 29.

The described devices and arrangements shown in the drawings may be used in any desirable combination.

While we have disclosed several embodiments of the present invention, it is to be understood that these embodiments are given by example only and not in a limiting sense, the scope of the present invention being determined by the objects and the claims.

We claim:
1. A gas centrifuge assembly comprising a plurality of drums, each of said drums having side walls and covers disposed at their ends, said drums forming a continuous column, a housing surrounding each of said drums, each of said drums having discharge opening means adapted to release gas fractions through said discharge opening means by the over pressure caused by the centrifugal force, each of said drums having an entrance opening for feeding gas fractions into said drums, each of said housings defining jointly with the corresponding of said drums discharge chambers communicating with said discharge opening means, and first conduits connecting one of said discharge chambers of each of said drums with said entrance opening of the next adjacent of said drums, and second conduits connecting the other of said discharge chambers with said entrance opening of the previous of said drums in said column, and a first receiving container communicating with said one of said discharge chambers of the last of said drums in said column, a second receiving container communicating with said other of said discharge chambers of said first of said drums in said column, said first and second conduits having a cross-section rendering low flow resistance.

2. The gas centrifuge assembly, as set forth in claim 1, which includes a sealed housing receiving said plurality of drums in series.

3. The gas centrifuge assembly, as set forth in claim 2, wherein each of said series comprises a plurality of drums disposed in parallel relative to each other.

4. The gas centrifuge assembly, as set forth in claim 2, wherein said sealed housing has a plurality of guide plates, and each pair of adjacent guide plates forming a conduit of large cross-section and connecting said respective discharge chambers with the entrance opening of the previous one and of the next following one of said drums in said series in said column respectively.

5. A gas centrifuge for the separation of isotopes by applying a counter-current principle, comprising a longitudinal, rotating drum including covers at the opposite ends of said drum, a housing surrounding said drum, one of said covers having an entrance opening disposed at the axial center thereof and adapted to feed starting gas fractions into said drum, said drum having a first and second discharge opening, at least one each in said covers, said housing defining a first chamber between one of said covers and said housing communicating with said first discharge opening, and said housing defining a second chamber between the other of said covers and said housing communicating with said second discharge opening, said housing having a third chamber between said housing and said drum between said first chamber and said second chamber, said first chamber receiving from said drum through said first discharge opening particles of a different density than that of particles received in said second chamber from said drum through said second discharge opening, means connected with said third chamber intermediate said first and second chambers for reducing the pressure in said third chamber to a lower pressure than that in said first and second chambers to prevent the intermixing of the gases in the first and second chambers through said third chamber.

6. The gas centrifuge, as set forth in claim 5, wherein said pressure reducing means comprises a suction pump operatively connected with said third chamber, in order to bring about a lower pressure in said third chamber.

7. The gas centrifuge, as set forth in claim 5, wherein said housing surrounds said drum closely thereto to form a cylindrical slot between said first and second chambers, to constitute said third chamber, and molecular pumps disposed in said cylindrical slot adjacent said first and second chambers, in order to bring about a suction effect in said cylindrical slot.

References Cited by the Examiner

UNITED STATES PATENTS

| | | | |
|---|---|---|---|
| 1,123,867 | 1/1915 | Gue | 233—21 |
| 2,549,968 | 4/1951 | Hachmuth | 233—22 X |
| 2,688,437 | 9/1954 | Monnet | 233—46 X |
| 2,720,313 | 10/1955 | Pattison | 233—21 X |
| 2,874,897 | 2/1959 | Corteggiani | 233—17 |
| 2,936,110 | 5/1960 | Cohen | 233—18 X |
| 2,947,472 | 8/1960 | Skarstrom et al. | 233—18 X |
| 3,007,629 | 11/1961 | Boyland | 233—21 |
| 3,108,955 | 10/1963 | Boyland | 233—17 X |

FOREIGN PATENTS 572,830  11/1958  Belgium.

M. CARY NELSON, *Primary Examiner.*

HERBERT L. MARTIN, REUBEN EPSTEIN, GEORGE D. MITCHELL, *Examiners.*

R. BURNETT, W. HOUGH, *Assistant Examiners.*